United States Patent [19]

Morimoto

[11] Patent Number: 4,843,918
[45] Date of Patent: Jul. 4, 1989

[54] SYSTEM FOR CONTROLLING A CONTINUOUSLY VARIABLE TRANSMISSION HAVING A TORQUE CONVERTER

[75] Inventor: Yoshihiko Morimoto, Mitaka, Japan
[73] Assignee: Fuji Jukogyo Kabushiki Kaisha, Tokyo, Japan
[21] Appl. No.: 200,704
[22] Filed: May 31, 1988
[30] Foreign Application Priority Data Jun. 2, 1987 [JP] Japan ................. 62-139462

[51] Int. Cl.⁴ ............................ B60K 41/18
[52] U.S. Cl. ........................... 74/866; 192/3.31
[58] Field of Search ........... 74/866, 867, 731, 868, 74/733; 192/3.31, 3.3

[56]  References Cited
U.S. PATENT DOCUMENTS

| 4,478,322 | 10/1984 | Carlson et al. | 192/3.31 X |
| 4,495,576 | 1/1985 | Ito | 74/867 X |
| 4,510,822 | 4/1985 | Yamamuro et al. | 192/3.31 X |
| 4,597,308 | 7/1986 | Tanaka et al. | 74/866 |
| 4,601,368 | 7/1986 | van Duersen | 192/3.31 X |
| 4,660,440 | 4/1987 | Matsumura et al. | 74/866 |
| 4,669,336 | 6/1987 | Okada et al. | 74/867 |
| 4,682,518 | 7/1987 | Takada et al. | 74/867 |
| 4,715,145 | 12/1987 | Takeda et al. | 74/866 X |
| 4,730,709 | 3/1988 | Kawata et al. | 192/3.31 |
| 4,735,113 | 4/1988 | Yamamuro et al. | 74/866 |

FOREIGN PATENT DOCUMENTS 55-109854 8/1980 Japan .
57-161359 10/1982 Japan .

Primary Examiner—Dirk Wright
Attorney, Agent, or Firm—Martin A. Farber

[57] ABSTRACT

A continuously variable belt drive transmission has a torque converter with a lockup clutch. The transmission ratio of the transmission starts to change in accordance with driving conditions of a vehicle, and the lockup clutch is engaged in accordance with driving conditions of the vehicle. A start signal for starting of the changing of the transmission ratio is produced in accordance with driving conditions, and a lockup signal for engaging of the lockup clutch is produced in accordance with driving conditions. In response to the start signal and to the lockup signal the change of the transmission ratio and engaging of the lockup clutch are performed with a time delay.

14 Claims, 6 Drawing Sheets

SYSTEM FOR CONTROLLING A CONTINUOUSLY VARIABLE TRANSMISSION HAVING A TORQUE CONVERTER

BACKGROUND OF THE INVENTION

The present invention relates to a hydraulic control system for a continuously variable belt-drive automatic transmission for a motor vehicle, and more particularly to a system for controlling a continuously variable transmission having a torque converter with a lockup clutch.

A continuously variable transmission having a torque converter with a lockup clutch is known. The torque converter operates to multiply the torque of an engine, so that the vehicle can be smoothly started. After the start of the vehicle, the torque converter is preferably locked up thereby preventing a loss of power and improving the fuel consumption. Thus, various control systems for controlling the lockup clutch have been proposed in order to effectively use such characteristics.

Japanese Patent Laid Open 55-109854 discloses a control system for a lockup clutch wherein the lockup clutch is engaged depending on the speed ratio of the speed of an input member to the speed of an output member of the torque converter to overcome the inefficiency of the torque converter.

However, if such a control system, in which the lockup clutch is operated regardless of the control of the transmission ratio, is applied to the continuously variable transmission, various problems arise. Namely although rotational speed of a drive pulley increases with the increase of vehicle speed before the start of the changing the transmission ratio (upshift) so as to advance the condition of the torque converter to a condition for a lockup range, the drive pulley speed does not increase after the start of upshifting. Therefore, a problem occurs that the torque converter does not enter into the lockup range. Thus, it is not desirable to control the torque converter irrespective of the transmision ratio. Instead, it is preferable to control the transmission so as to fix the transmission ratio while the torque converter operates to multiply the torque and to start the changing of the transmission ratio and, at the same time, to lock up the torque converter, when the transmission comes into the condition for the lockup and the condition for starting the upshift.

However, in the above-described conventional art, since lockup of the torque converter is determined in accordance with a predetermined speed ratio between the input speed and the output speed, when the difference between the speeds increases although the speed ratio is constant, the lockup shock becomes large.

SUMMARY OF THE INVENTION

The object of the present invention is to provide a system for controlling a torque converter having a lockup clutch wherein the transmission ratio starts to change at the same time as the lockup of the torque converter, and to provide a system which may reduce the shock at the engagement of the lockup clutch.

The other objects and features of this invention will become understood from the following description with reference to the accompanying drawings.

DETAILED DESCRIPTION OF THE PREFERRED EMBODIMENT

Figure 1:
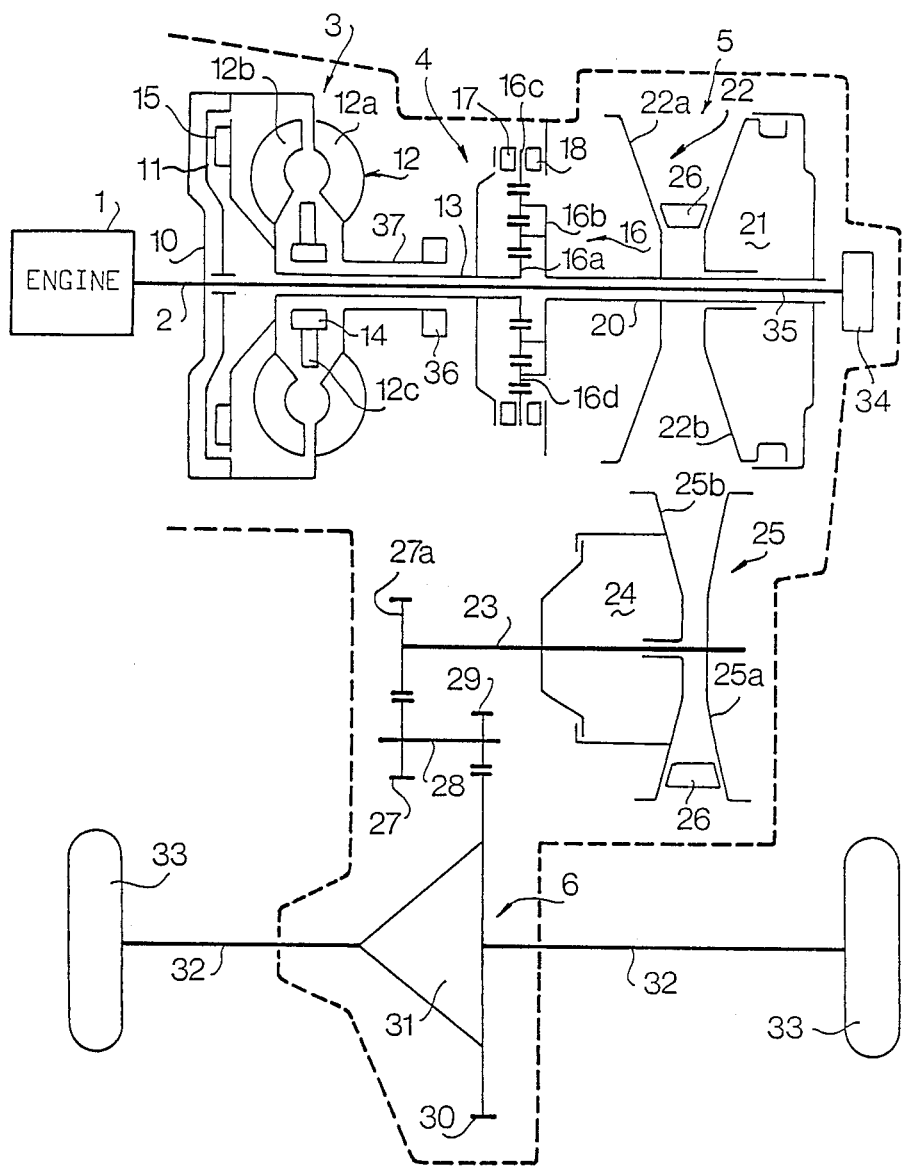
FIG. 1 shows a schematic diagram of a continuously variable belt-drive transmission to which the present invention is applied.

FIG. 1 shows a four-wheel drive power transmission system with a continuously variable belt-drive automatic transmission for a motor vehicle, to which the present invention is applied. An engine 1 is mounted on a motor vehicle at a front portion thereof. The power transmission system comprises a torque converter device 3, a selector device 4, a continuously variable belt-drive transmission 5, and a final reduction and differential device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a integral with the converter cover 11 by welding, a turbine 12b connected to an input shaft 13, and a stator 12c connected to a one-way clutch 14. The lockup clutch 15 is disposed between the converter cover 11 and the torque converter 12 for making a contact with the cover 11.

The selector device 4 comprises a planetary gear 16 having a pair of pinions 16d, and a sun gear 16a mounted on the input shaft 13. Pinions 16d are supported on a carrier 16b. The sun gear 16a is engaged with a ring gear 16c through pinions 16d. A forward clutch 17 is disposed between the sun gear 16a and the ring gear 16c. A reverse brake 18 is disposed between the ring gear 16c and a main case. At forward driving such as a drive range (D) selection, the forward clutch 17 is engaged to lock the sun gear 16a. At reverse driving, the reverse brake 18 is engaged to lock the ring gear 16c for reversely rotate the carrier 16b.

The belt-drive transmission 5 has a main shaft 20 engaged with the carrier 16b and an output shaft 23 provided in parallel with the main shaft 20. A drive pulley (primary pulley) 22 and a driven pulley (secondary pulley) 25 are mounted on the main shaft 20 and output shaft 23, respectively. A fixed conical disc 22a of the drive pulley 22 is integral with main shaft 20 and an axially movable conical disc 22b is axially slidably mounted on the main shaft 20. The movable conical disc 22b also slides in a cylinder 21 formed on the main shaft 20 to provide a servo device.

A fixed conical disc 25a of the driven pulley 25 is formed on the output shaft 23 opposite the movable conical disc 22b and a movable conical disc 25b is slidably mounted on the shaft 23 opposite the disc 22a. Movable conical disc 25b has a cylindrical portion which is slidably engaged in a cylinder 24 of the output shaft 23 to form a servo device. A drive belt 26 engages with the drive pulley 22 and the driven pulley 25. The cylinder 21 of the drive pulley 22 is so designed that the pressure receiving area thereof is larger than that of the cylinder 24 of the driven pulley 25. Thus, the running diameter of the belt 26 on the pulleys is varied dependent on driving conditions.

Secured to the output shaft 23 is a drive gear 27a of the final reduction device 6 which engages with an intermediate reduction gear 27 on an intermediate shaft 28. An intermediate gear 29 on the shaft 28 engages with a final reduction gear 30. The rotation of the final reduction gear 30 is transmitted to axles 32 of vehicle driving wheels 33 through a differential 31.

In the transmission 5, a main oil pump 34 is provided for supplying a high pressure of oil for the transmission. The main shaft 20 has an axial passage in which a main oil pump driving shaft 35 connected to the crankshaft 2 is rotatably mounted. An auxiliary oil pump 36 for the torque converter device 3 is housed therein. An auxiliary pump drive shaft 37 is connected to the impeller 12a and is operatively connected with the converter cover 11.

Figure 2:
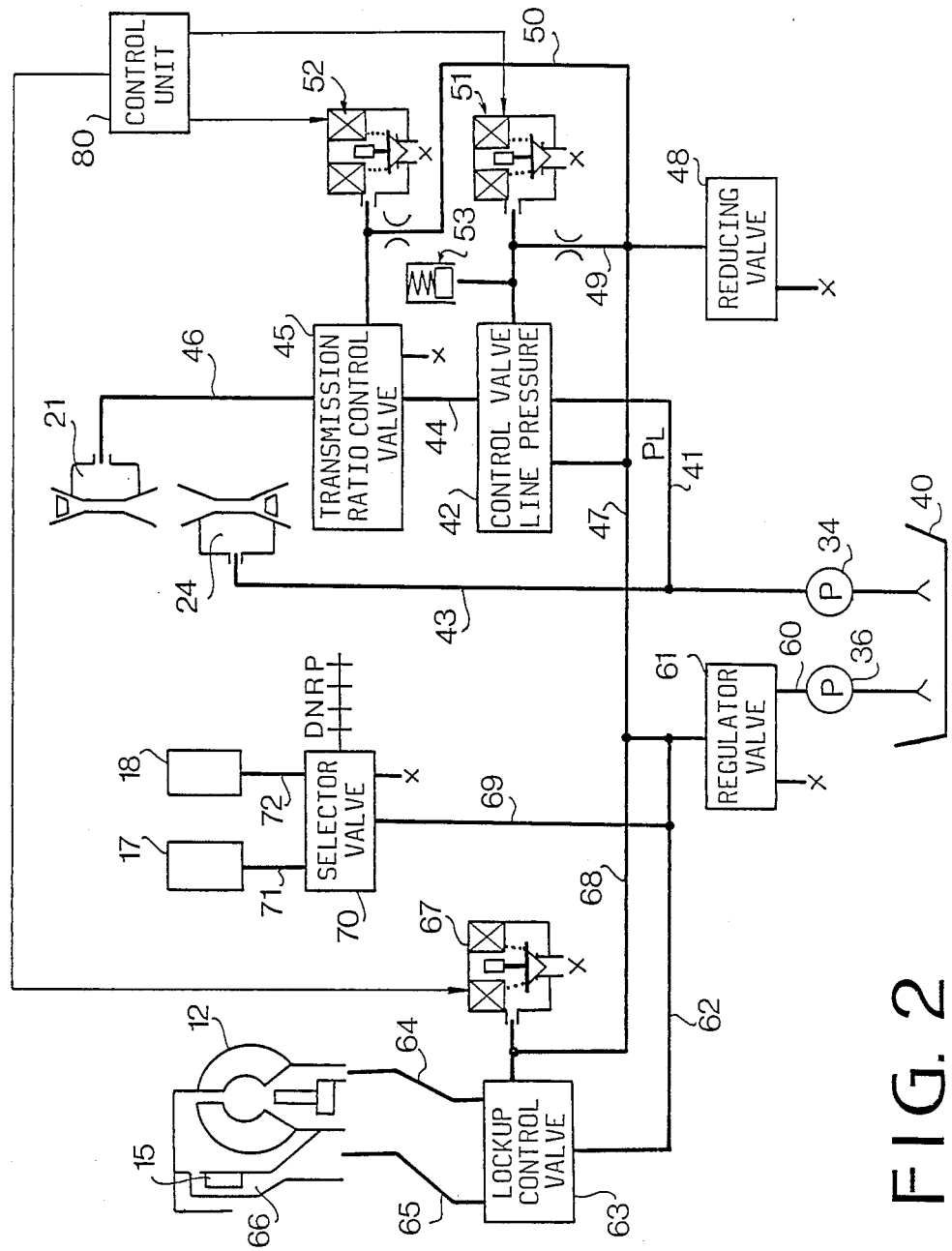
FIG. 2 shows a hydraulic control circuit for the transmission.

Referring to FIG. 2, showing a hydraulic control circuit, oil in an oil reservoir 40 is supplied to a line pressure control valve 42 through a line pressure passage 41 by the pump 34. An oil passage 43 connected to the passage 41 is communicated with the cylinder 24 of the driven pulley 25. The passage 41 is further communicated with a transmission ratio control valve 45 through a passage 44. The cylinder 21 of the drive pulley 22 is applied with pressurized oil passing through the passage 41, line pressure control valve 42, passage 44, transmission ratio control valve 45, and a passage 46.

A passage 60 connected to the oil pump 36 is communicated with a passage 47. The pressure of oil supplied to the passage 47 is regulated by a regulator valve 61 to produce a low control pressure. The passage 47 is connected to a drain port of the line pressure control valve 42.

The passage 47 is communicated with a reducing valve 48 for providing a constant reducing pressure of oil. A conduit 49 is communicated with the line pressure control valve 42. The conduit 49 is also communicated with a solenoid operated on-off valve 51 and with an accumulator 53. Further, the passage 47 is communicated with the transmission ratio control valve 45 through a passage 50 and with a solenoid operated on-off valve 52.

The solenoid operated valve 51 is adapted to be operated by duty signals from a control unit 80 for producing control pressure in the form of pulses and the control pressure is applied to a spool of the line pressure control valve 42 to shaft the spool, so that the line pressure $P_L$ is controlled in accordance with the transmission ratio i, engine torque Te, and torque increasing factor of the torque converter.

The solenoid operated valve 52 is also operated by duty signals from the control unit 80 and produces reducing pressure which is applied to the transmission ratio control valve 45 for shifting a spool of the valve 45 to an oil supply position and an oil drain position by the degree of duty cycle. Thus, the flow rate of oil supplied to or drained from the cylinder 21 of the drive pulley 22 is controlled to provide optimum transmission ratio i.

The passage 60 is communicated with the lockup control valve 63 through a passage 62. The lockup control valve 63 is communicated with the torque converter 12 through a passage 64 and a release side oil chamber 66 of the lockup clutch 15 through a passage 65. The lockup control valve 63 is communicated with the reducing valve 48 through passage 68 for supplying with the reducing pressure. The reducing pressure is also supplied to a solenoid operated on-off valve 67. The solenoid operated valve 67 operates the lockup control valve 63 to communicate the passage 62 with the passage 64 or the passage 65.

The passage 62 is further communicated with a selector valve 70 through a passage 69. The selector valve 70 is provided for selectively connecting passages in accordance with operations of a selector lever for selecting operational ranges such as a parking range (P), reverse range (R), neutral range (N), and drive range (D). The selector valve 70 is communicated with the forward clutch 17 through a passage 71 and with the reverse brake 18 through a passage 72.

Figure 3A:
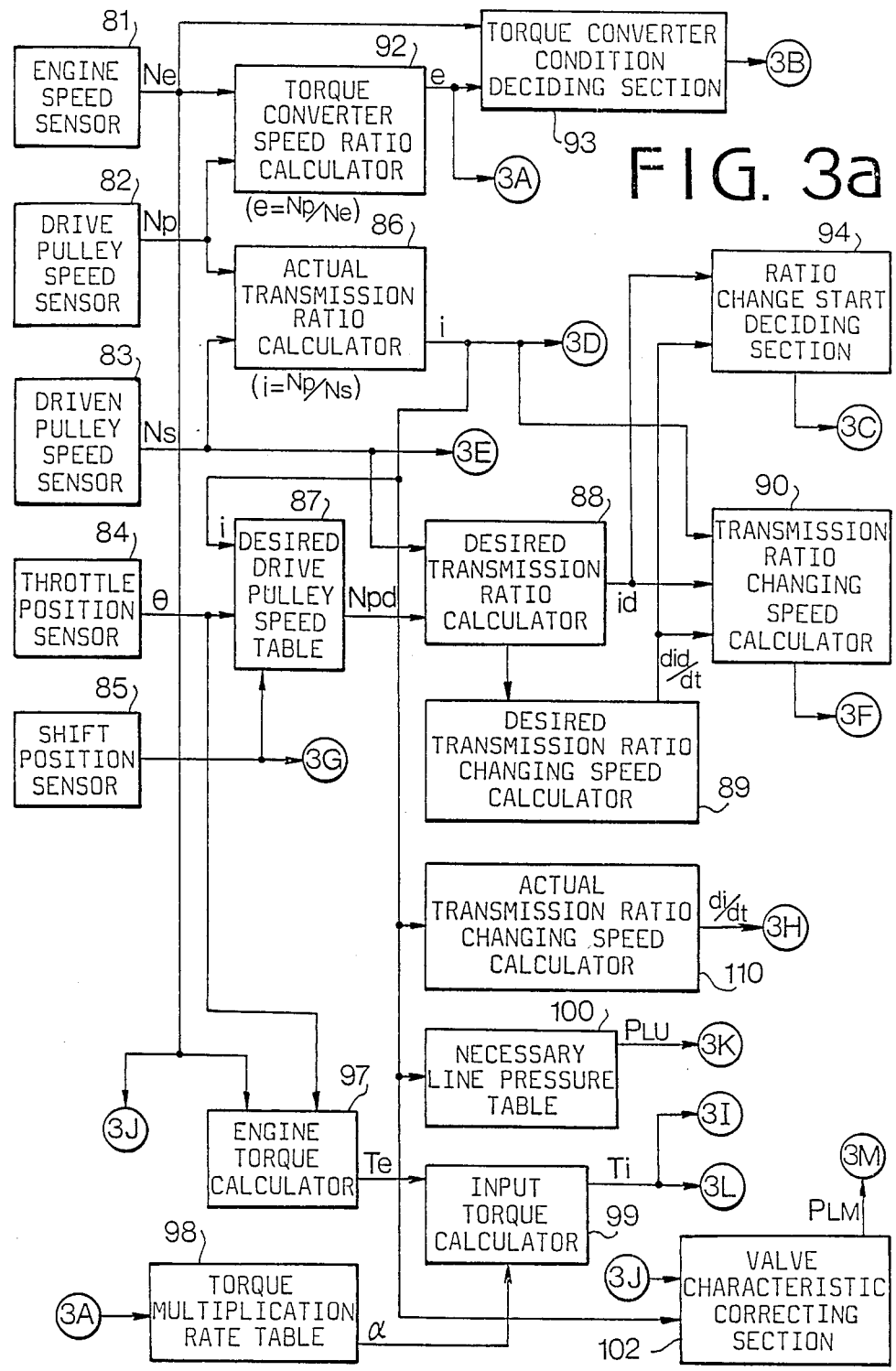
FIGS. 3a and 3b show a block diagram showing a control unit according to the present invention.
Figure 3B:
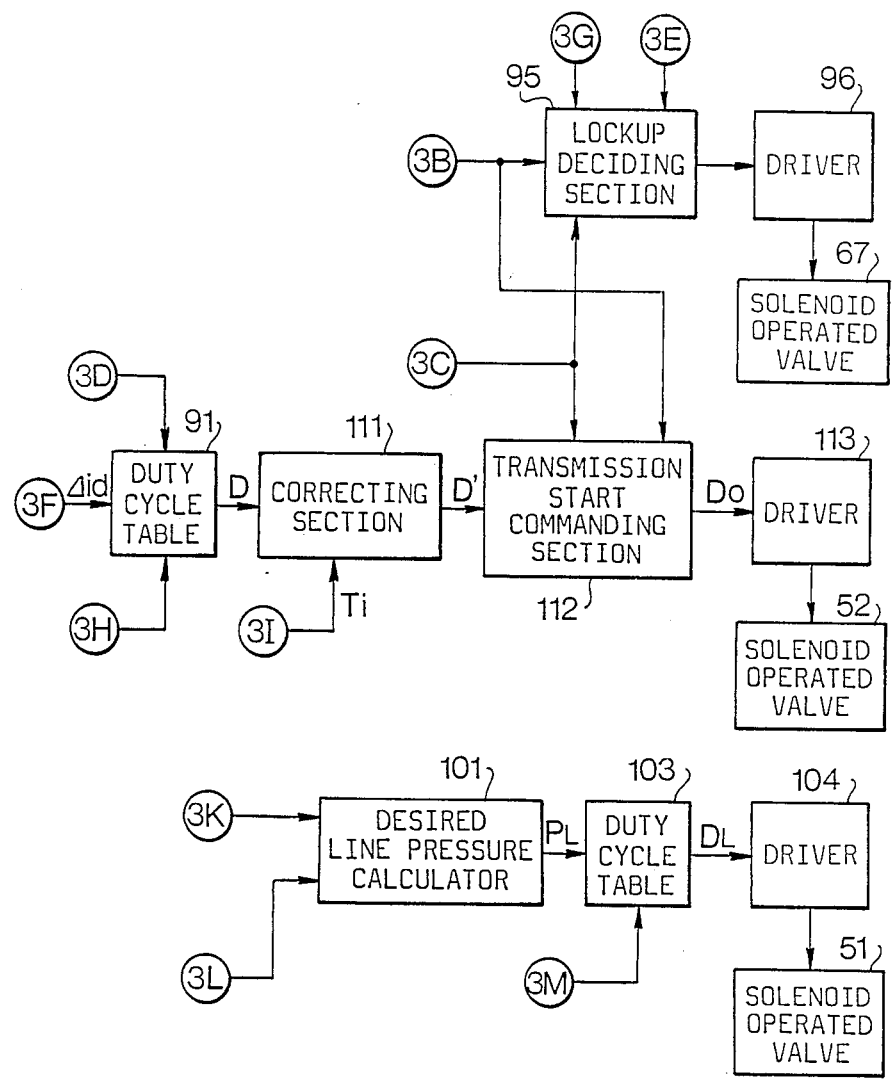

Referring to FIGS. 3a and 3b, the system is arranged to control the transmission ratio, the lockup clutch for the torque converter, and the line pressure. In the system, an engine speed sensor 81, a drive pulley speed sensor 82, a driven pulley speed sensor 83, a throttle position sensor 84, and a shift position sensor 85 are provided.

Output signals $N_P$ and $N_S$ of sensors 82, 83 are fed to an actual transmission ratio calculator 86 to produce an actual transmission ratio i in accordance with $i = N_P/N_S$. The actual transmission ratio i and output signal $\theta$ of the throttle position sensor 84 are fed to a desired drive pulley speed table 87 to derive a desired drive pulley speed Npd in accordance with values of the ratio i and signal $\theta$. The desired drive pulley speed Npd and the driven pulley speed Ns are fed to a desired transmission ratio calculator 88 to calculate a desired transmission ratio id in accordance with the speeds Npd and Ns.

The desired transmission ratio id is fed to a desired transmission ratio changing speed calculator 89 which produces a desired transmission ratio changing speed (rate) did/dt. The speed (rate) did/dt is the amount of change of the desired transmission ratio id during a predetermined time interval. The actual transmission ratio i, desired transmission ratio id, and desired transmission ratio changing speed did/dt are applied to a transmission ratio changing speed calculator 90 to produce a transmission ratio changing speed (rate) $\Delta$ id from the formula as follows.

$$\Delta id = K1(id-i) + K2 \cdot did/dt \qquad (1)$$

where K1 and K2 are coefficients.

The speed (rate) $\Delta$ id and actual ratio i are applied to a duty cycle table 91 to derive a duty cycle D in accordance with D=f ($\Delta$id, i) using a table at upshift and downshift of the transmission. The duty cycle D is supplied to the solenoid operated on-off valve 52 through a driver 113. The duty cycle D at the start of the changing of the transmission ratio is further corrected as described hereinafter.

The engine speed signal Ne from the sensor 81 and the drive pulley speed signal Np from the sensor 82 are applied to a torque converter speed ratio calculator 92 to produce an actual torque converter speed ratio e in accordance with e=Np/Ne. The speed ratio e is compared with a predetermined speed ratio $e_s$ in a torque converter condition deciding section 93 to determine whether it is in a converter operational state or in a zone to be coupled.

Figure 4A:
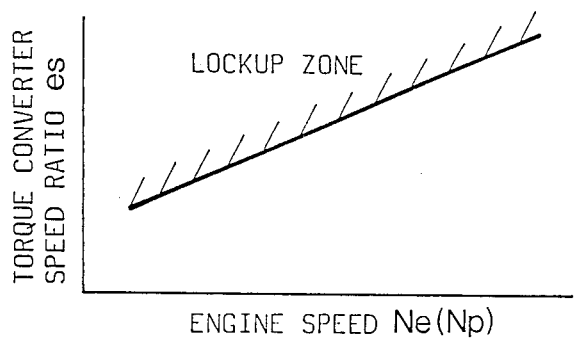
FIG. 4a is a graph showing a lockup zone of a torque converter in relation to torque converter speed ratio and engine speed.
Figure 4B:
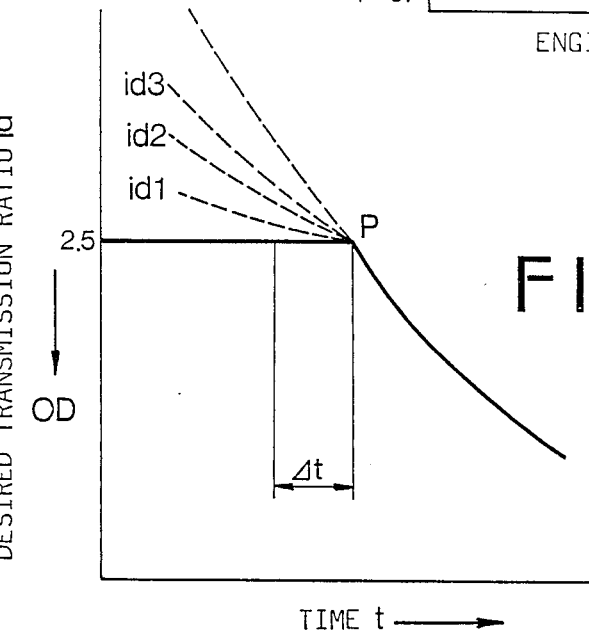
FIG. 4b is a graph showing characteristics of desired transmission ratio.
Figure 4C:
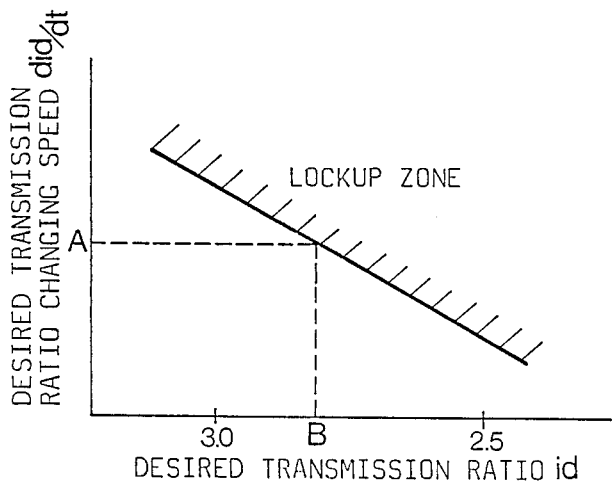
FIG. 4c is a graph showing a lockup zone of the torque converter in relation to desired transmission ratio changing speed rate and desired transmission ratio.

In order to reduce the engagement shock of the lockup clutch which increases when the speed difference ΔN between the engine speed Ne and drive pulley speed Np becomes large, the reference speed ratio $e_s$ is set to increase with the increase of the engine speed Ne as shown in the graph of FIG. 4a. Thus, it is determined that the torque converter is in the zone to be coupled when the speed ratio e is larger than the speed ratio $e_s$ (e≧$e_s$). The desired transmission ratio id and the desired transmission ratio changing speed did/dt are fed to a ratio change start deciding section 94. The deciding section 94 determines that the transmission starts to upshift when the desired ratio id is smaller than the largest transmission ratio 2.5 (id <2.5). The desired transmission ratio calculator 88 produces the desired transmission ratio id even though the desired ratio id is larger than 2.5(id ≧2.5) as shown by references id1, id2, id3 . . . in FIG. 4b. During such a period, that is when the changing of the transmission ratio is not yet tarted, the desired transmission ratio id varies as $id_1$, $id_2$ . . . in dependency on the driving conditions. The upshift is started after a predetermined delay time Δt. It is necessary to start changing of the transmission ratio at a larger value of the desired transmission ratio id as the desired transmission ratio changing speed did/dt increases. FIG. 4c shows the desired transmission ratio id at which the transmission ratio starts to change. For example, when the desired transmission ratio changing speed did/dt is A, the changing of the transmission ratio is determined to start by the ratio change start deciding section 94 when the desired transmission ratio id reaches B. Output signals from the sections 93, 94, the shift position sensor 85 and the driven pulley speed sensor 83 are applied to a lockup deciding section 95 where a lockup signal is produced only under the following conditions. Namely, the speed ratio e is larger than the predetermined speed ratio $e_s$, the transmission ratio had started to change, either the D or Ds range is selected, and the driven pulley speed Ns is larger than a predetermined speed Nso(Ns≧Nso). The lockup signal is applied to the solenoid operated valve 67 through a driver 96 to engage the lockup clutch 15.

Figure 4D:
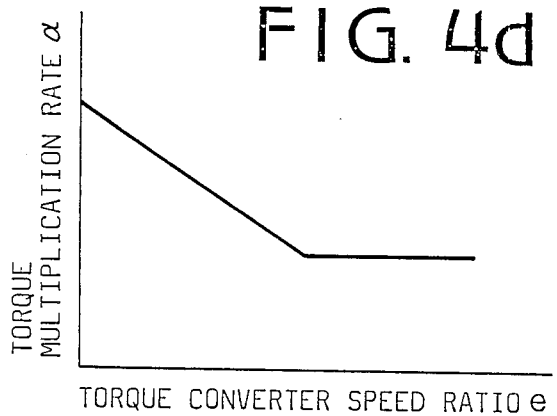
FIG. 4d is a graph showing a relationship between torque multiplication and torque converter speed ratio.

Further, the throttle position signal θ and the engine speed signal Ne are fed to an engine torque calculator 97, so that engine torque Te is calculated based on throttle position and engine speed Ne. The speed ratio e is applied to a torque multiplication rate table 98 when the transmitting torque is varied in accordance with the increase of the torque of the torque converter. A torque multiplication rate α is derived from a table, as shown in FIG. 4d. The engine torque Te and the torque multiplication rate α are applied to an input torque calculator 99, so that an input torque Ti is calculated by Ti=· Te α.

On the other hand, the actual transmission ratio i from the calculator 86 is applied to a necessary line pressure table 100 to derive a necessary line pressure $P_{LU}$ per unit torque. The necessary line pressure $P_{LU}$ and the torque Ti are applied to a desired line pressure calculator 101 where a desired line pressure $P_L$ is calculated by $P_L = P_{LU} \times Ti$.

In the hydraulic circuit, the pump oil pressure varies in accordance with the change of the engine speed Ne, caused by the characteristic of the line pressure control valve 42 so that a maximum line pressure $P_{LM}$ also varies. In order to prevent the variance of necessary line pressure $P_{LU}$ by the maximum line pressure $P_{LM}$, the control unit is provided with a valve characteristic correcting section 102 to which the engine speed Ne and the actual transmission ratio i are supplied. Therefore, the necessary line pressure $P_{LU}$ becomes stable.

The desired line pressure $P_L$ and the maximum line pressure $P_{LM}$ are applied to a duty cycle table 103 to derive a duty cycle $D_L$ corresponding to the desired line pressure $P_L$. The duty cycle $D_L$ is supplied to driver 104 which operates the solenoid operated on-off valve 51 at the duty cycle.

The system for correcting the duty cycle of the solenoid operated valve 52 for the transmission ratio control valve is described hereinafter.

Before the start of the changing of the transmission ratio, the desired transmission ratio id is larger than 2.5 (id>2.5) and the desired transmission ratio changing speed did/dt and the desired transmission ratio id are calculated accordingly. However, the duty cycle in the table 91 depending on Δid and i is set for the actual control of the transmission ratio. Namely the transmission ratio changing speed Δid is based on the actual transmission ratio i and desired ratio id. However, the desired transmission ratio id is set at 2.5(id=2.5) before the start of changing. Thus, in the desired transmission ratio zone when id is larger than 2.5, if the duty cycle D is derived dependent on the transmission ratio changing speed Δid calculated by the aforementioned equation (1), the actual transmission ratio does not coincide with the calculated desired transmission ratio id.

Accordingly, an actual transmission ratio changing speed calculator 110, to which the actual transmission ratio i is applied, is provided to calculate an actual transmission ratio changing speed (rate) di/dt. The speed (rate) di/dt is applied to the duty ratio table 91 where a corrected Δid' is obtained from the following equation.

$$\Delta id' = K(di/dt)[K_1(id-i) + K_2 \cdot did/dt]$$

where K is a function of di/dt. Thus, the corrected duty cycle D can be derived from the table 91.

The duty cycle D is further corrected at a correcting section 111 to which the input torque Ti is applied. While the torque is multiplied by the torque converter, the line pressure is high so that the transmission ratio changing speed must be corrected. A corrected duty cycle D' is calculated in accordance with D'=f (1/√Ti, D) so as to increase the transmission ratio changing speed.

The corrected duty cycle D' is applied to a transmission start commanding section 112 where output signals of the ratio change start deciding section 94 and the torque converter condition deciding section 93 are applied. When the torque converter is not locked up, output duty cycle Do is set at zero (Do=0), so as not to start the changing of the transmission ratio. When the driving conditions are appropriate for locking the torque converter, duty cycle ΔD dependent on the desired transmission ratio changing speed did/dt and the desired transmission ratio id is corrected to be increased. Thus, output duty cycle Do is obtained from Do =D'+ΔD. The duty cycle Do is supplied to the solenoid operated valve 52 through a driver 113.

When the P or N range is selected at starting, oil in the forward clutch 17 and the reverse brake 18 are drained. Thus, the planetary gear 16 is released to disengage the transmission 5. At the same time, oil pumps 34 and 36 are driven by the oil pump driving shaft 35 and the converter cover 11 to supply pressurized oil to the line pressure control valve 42, regulator valve 61 and reducing valve 48. The line pressure is applied only to the cylinder 24 of the driven pulley 25 so that the drive belt 26 engages with the driven pulley 25 at a maximum running diameter to provide the largest transmission ratio (low speed stage). In this state, lockup deciding section 95 applies a signal to the solenoid operated valve 67 so as to apply the pressurized oil to release side chamber 66 of the lockup clutch 15. The oil is further supplied to the torque converter 12 so as to operate it.

When the D range is selected, the actuating pressure is applied to the forward clutch 17 to lock the planetary gear 16, so that the input shaft 13 is engaged with the main shaft 20. Thus, the torque converter 12 operates to transmit the power of the engine to the automatic transmission 5. The power of the engine is transmitted to the output shaft 23 at the largest transmission ratio by the drive belt 26 and pulleys 22, 25 and further transmitted to axles 32 of the driving wheels 33 through the final reduction device 6. Thus, the vehicle is started.

At the start of the vehicle, the torque converter 12 multiplies the output torque of the engine at a small speed ratio e. The torque multiplication rate $\alpha$ is derived from the table 98 so as to increase the desired line pressure $P_L$. Thus, the line pressure controlled by the line pressure control valve 42 is increased in accordance with the maximum transmission ratio and engine torque thereby transmitting the torque multiplied by the torque converter without slipping of the belt.

At the same time, since speed ratio e is smaller than the predetermined speed ratio $e_s (e<e_s)$, it is determined that the torque converter 12 is in the operational state. The output signal of the section 93 is fed to the transmission start commanding section 112 so that duty cycle Do becomes zero, thereby preventing the transmission ratio from changing.

Figure 5:
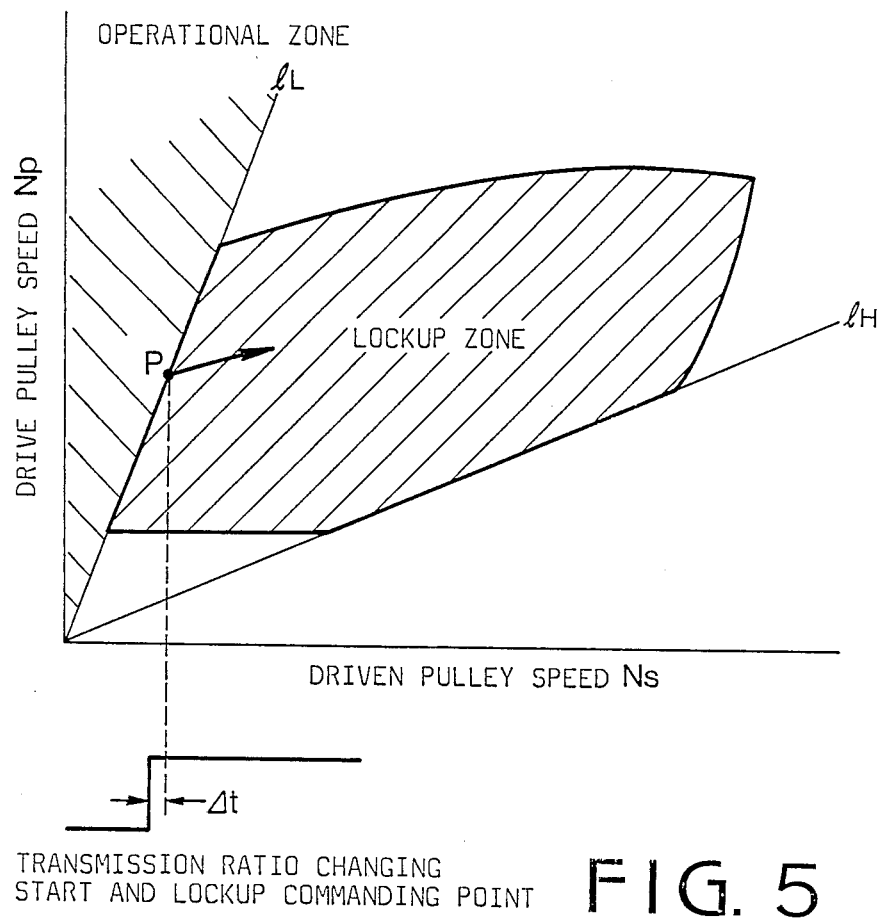
FIG. 5 is a graph showing a relationship between drive pulley speed and driven pulley speed.

At the start of the vehicle, the transmission ratio is at a larger side than the largest transmission ratio line $1_L$ in the graph shown in FIG. 5, to provide a low speed stage. The actual transmission ratio is held at the maximum value 2.5. In the control system of the transmission ratio, the actual transmission ratio i, desired drive pulley speed Npd, desired transmission ratio id and desired transmission ratio changing speed did/dt are obtained to calculate the transmission ratio changing speed $\Delta$id in the transmission ratio changing speed calculator 90. The transmission ratio changing speed $\Delta$id is further corrected in dependency on the actual transmission ratio changing speed di/dt. The duty cycle D derived from the table 91 in dependency on the corrected transmission ratio changing speed $\Delta$id' is corrected so as to comply with the necessary line pressure which is increased as the result of the multiplication of the engine torque. Therefore, the transmission ratio thus theoretically changes toward a point P in FIG. 5 as shown by the dotted line, although the transmission ratio does not change in actuality.

When the desired transmission ratio changing speed did/dt is large so as to rapidly change the transmission ratio, the ratio change start deciding section 94 determines that the changing of the transmission ratio should be started at a large transmission ratio id. Namely, if the desired transmission ratio id and desired transmission ratio changing speed did/dt reach the conditions shown in FIG. 4c, the ratio change start deciding section 94 produces a start signal which is applied to the lockup deciding section 95 and to the transmission start commanding section 112 with the time delay $\Delta$t for compensating the operational delay of the hydraulic circuit. If it is already determined in the torque converter condition deciding section 93 that the torque converter is in the zone to be locked in dependency on the speed ratio e and speed difference $\Delta$N, an output signal is applied to the lockup deciding section 95 thereby determining the lockup.

Accordingly, the lockup signal is applied to the solenoid operated valve 67 thereby operating the lockup valve 63 to apply the pressurized oil to the torque converter 12 and to drain the release side chamber 66 of the lockup clutch 15. Accordingly, the lockup clutch 15 engages with the converter cover 11 to effectively transmit the engine torque. Thus, as shown in FIG. 5, the zone between the largest transmission ratio line $1_L$ and the smallest transmission ratio line $1_H$ is the lockup zone.

On the other hand, the output signals of the deciding sections 93 and 94 are applied to the transmission start commanding section 112 which in turn feeds a signal representing the duty cycle Do to the solenoid operated valve 52. Thus, the transmission ratio control valve 45 operates to apply the pressurized oil to the drive pulley 22. Thus, the transmission ratio starts to change at the point P on the largest transmission ratio line $1_L$ in FIG. 5, which is the point where the lockup clutch 15 is locked. Accordingly the transmission is upshifted.

In the lockup state, since the speed ratio e is one, the torque multiplication rate $\alpha$ becomes one. Therefore, line pressure is controlled dependent only on the actual transmission ratio i and engine torque Te. Additionally, the correcting operation for increasing the line pressure during the torque converter operational zone in the correcting section 111 is terminated.

If it is still determined that the torque converter is in the operational zone, the start of the changing of the transmission ratio is prevented until the lockup zone is determined so that the start of the changing of the transmission ratio and the lockup of the torque converter is operated simultaneously.

In accordance with the present invention, the desired transmission ratio before the start of the changing of the transmission ratio is calculated so as to accurately predict the timing of the start. The lockup clutch is engaged and the starting of the changing of the transmission ratio begins with a delay time. Thus, in spite of delay of the operation of the hydraulic circuit, response of the system for the lockup and starting of the change of ratio is improved.

Since the speed ratio e and speed difference $\Delta$N of the torque converter are calculated to determine the condition thereof, the lockup shock is reduced.

The transmission ratio changes only when the torque converter is locked so that the operation of the torque converter and the lockup thereof are sufficiently effected.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a belt drive continuously variable transmission for transmitting power of an engine to wheels of a vehicle, said transmission comprising a belt running over a drive and a driven pulley, and a shift lever for changing a driving range, said engine having a throttle for changing speed, the system having a hydraulic circuit including a transmission ratio control valve operated in accordance with driving conditions of the vehicle for controlling transmission ratio of the transmission, and the transmission having a torque converter with a lockup clutch, the system comprising:

sensing means for detecting speeds of said engine, said drive pulley and said driven pulley, and positions of said throttle and said shift lever;

a control valve to be operated in accordance with driving conditions of the vehicle, for controlling oil supplied to the transmission ratio control valve to start changing of the transmission of the transmission ratio;

a lockup control valve to be operated in accordance with driving conditions of the vehicle to engage the lockup clutch;

calculator means responsive to said sensing means for producing an actual transmission ratio, and for comparing said actual transmission ratio with a desired transmission ratio in a storing means, and for producing a desired transmission ratio changing rate;

first deciding means for producing a start signal for starting of the changing of the transmission ratio in accordance with data from said calculator means;

second deciding means for producing a lockup signal for engaging the lockup clutch in accordance with data from said sensing means and said start signal;

actuating means responsive to the start signal and to the lockup signal for operating the control valve with data from said calculator means and for operating the lockup control valve, respectively, and for starting the change of the transmission ratio and for engaging the lockup clutch before a certain time to compensate an operational delay of the hydraulic circuit.

2. The system according to claim 1, wherein the first deciding means produces the start signal such that the transmission ratio starts to change at a desired transmission ratio which increases with increase of the desired transmission ratio changing rate.

3. The system according to claim 1 wherein the second deciding means produces the lockup signal based on an actual torque converter speed ratio of an output member of the torque converter to an input member of the torque converter and on difference between the speeds of the output member and the input member.

4. The system according to claim 1, wherein said storing means comprises a desired drive pulley speed table responsive to the positions of said throttle and of said shift lever and to the actual transmission ratio and producing a desired drive pulley speed.

5. The system according to claim 4, wherein said storing means further includes a desired transmission ratio calculator dividing said desired drive pulley speed by the speed of said driven pulley to provide said desired transmission ratio.

6. The system according to claim 1, wherein said calculator means includes a transmission ratio changing speed calculator for providing a transmission ratio changing rate for controlling said control valve via said actuating means, said transmission ratio changing rate being the sum of terms, one of the terms being a first coefficient multiplied by the difference between said desired and actual transmission ratios and the other term being a second coefficient multiplied by the desired transmission ratio changing rate.

7. The system according to claim 6, wherein said first coefficient is a function of an actual transmission ratio changing rate.

8. The system according to claim 6, wherein said actuating means includes a transmission start commanding section receiving the transmission ratio changing rate and said lockup and start signals.

9. The system according to claim 6, wherein said actuating means includes
a duty cycle table responsive to said transmission ratio changing rate, said actual transmission ratio and an actual transmission ratio changing rate to produce a duty cycle,
a correcting section responsive to the duty cycle from the duty cycle table and to an input torque from an input torque calculator responsive to engine torque, the correcting section producing a corrected duty cycle, and
a transmission start commanding section responsive to said lockup and start signals and said corrected duty cycle for controlling said control valve.

10. The system according to claim 9, further comprising
an engine torque responsive to speed of said engine and position of the throttle detected by said sensing means, and producing and sending the engine torque to said input calculator, and
a torque multiplication rate table responsive to an actual torque converter speed ratio of speed of an input member to speed of an output member of the torque converter for producing and sending a torque multiplication rate to said input torque calculator, and
the correcting section produces said corrected duty cycle as a function of 1 divided by the square root of the input torque.

11. The system according to claim 3, wherein said second deciding means is responsive to the sensing means, and wherein the speed of the input member is the speed of the engine detected by said sensing means.

12. The system according to claim 11, wherein said second deciding means compares said actual torque converter speed ratio with a predetermined speed ratio and produces said lockup signal when said actual torque converter speed ratio is greater than said predetermined speed ratio, and said predetermined speed ratio increases with an increase in engine speed.

13. The system according to claim 1, wherein said first deciding means produces said start signal when the desired transmission ratio is less than a maximum transmission ratio of the transmission.

14. The system according to claim 10, further comprising
a torque converter condition deciding section connected to said second deciding means and to said transmission start commanding section, said torque converter condition deciding section compares said actual torque converter speed ratio with a predetermined speed ratio and said second deciding means produces said lockup signal when said actual torque converter speed ratio is greater than said predetermined speed ratio, said predetermined speed ratio increasing with an increase in engine speed.

* * * * *